Patented Sept. 23, 1947

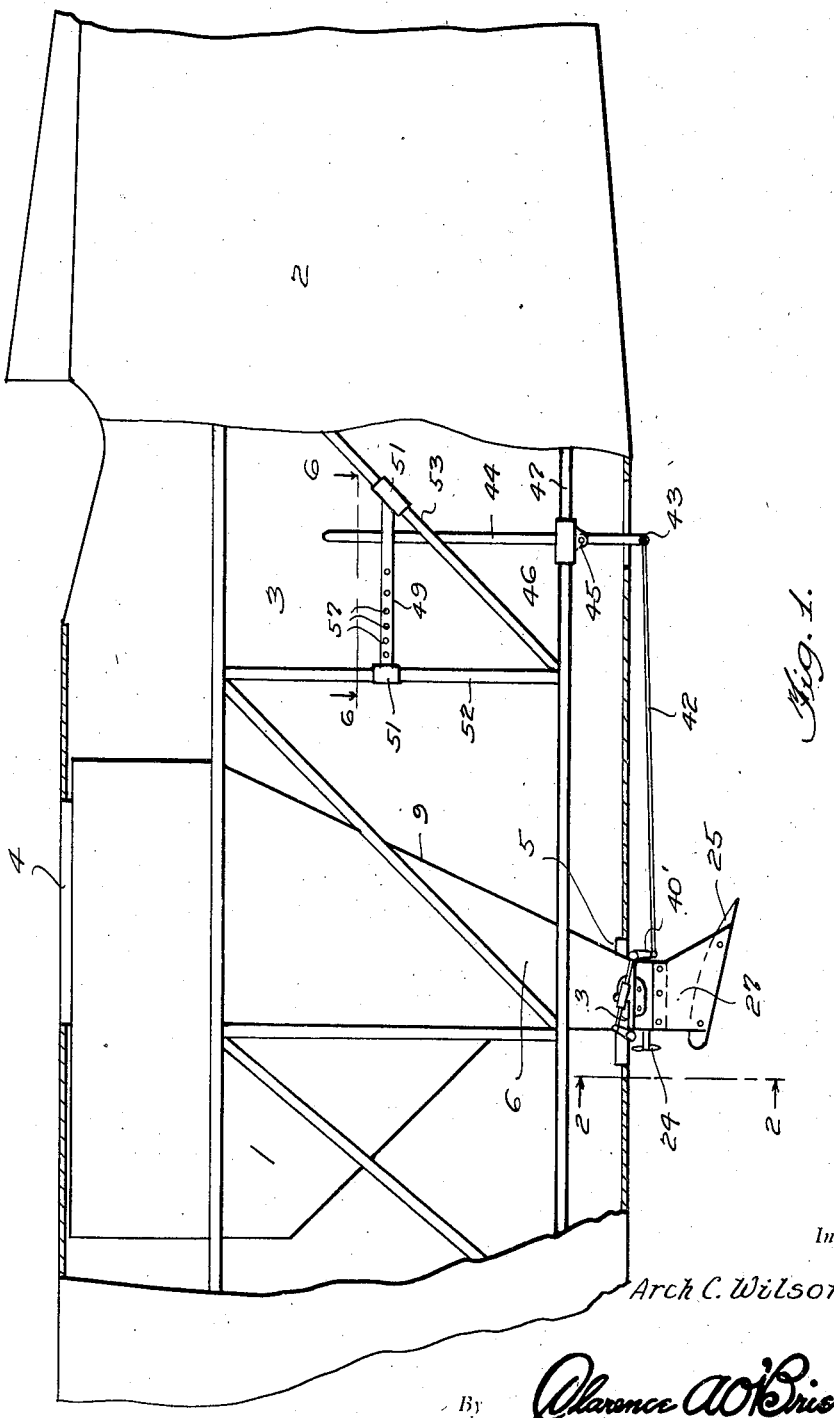

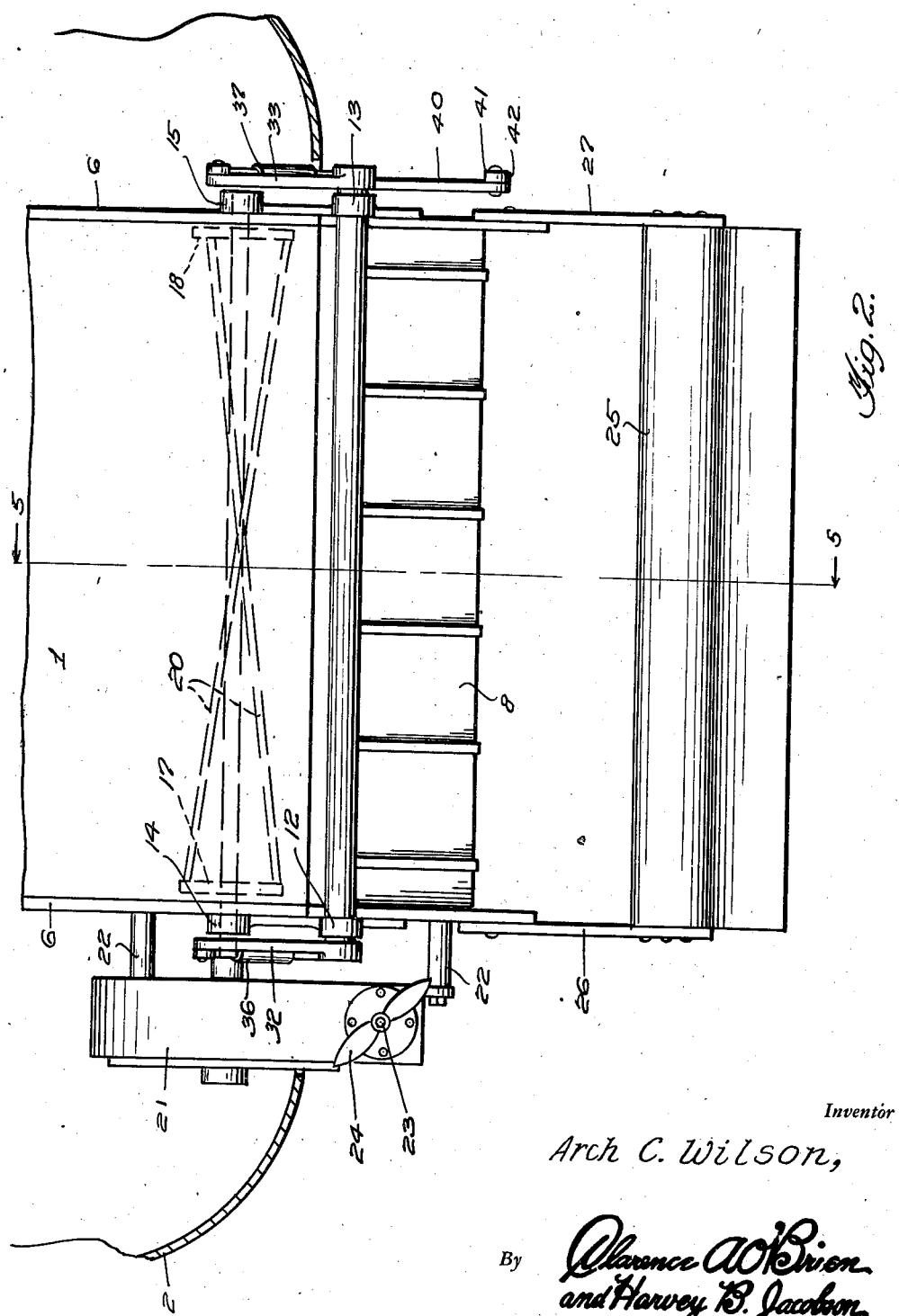

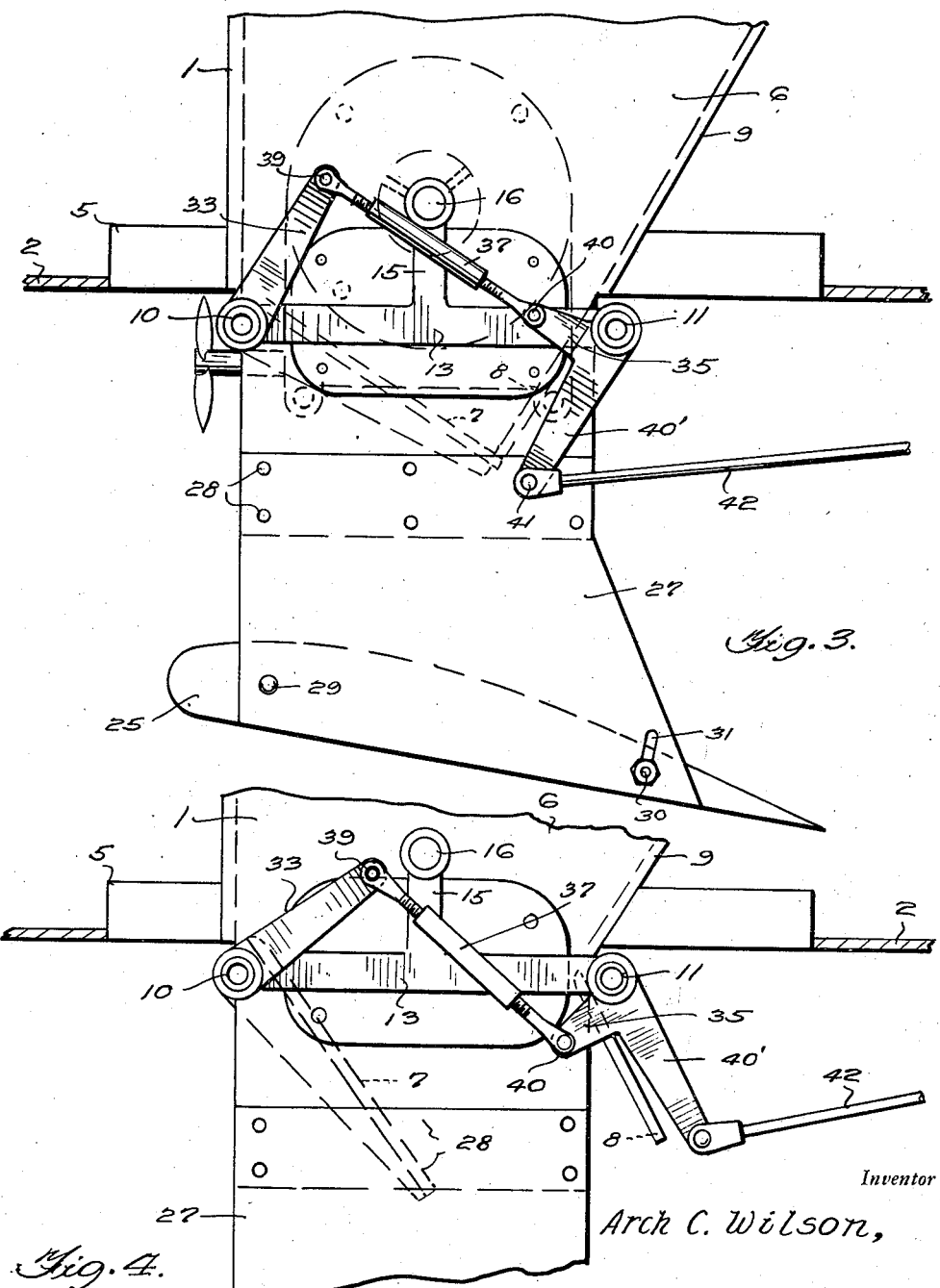

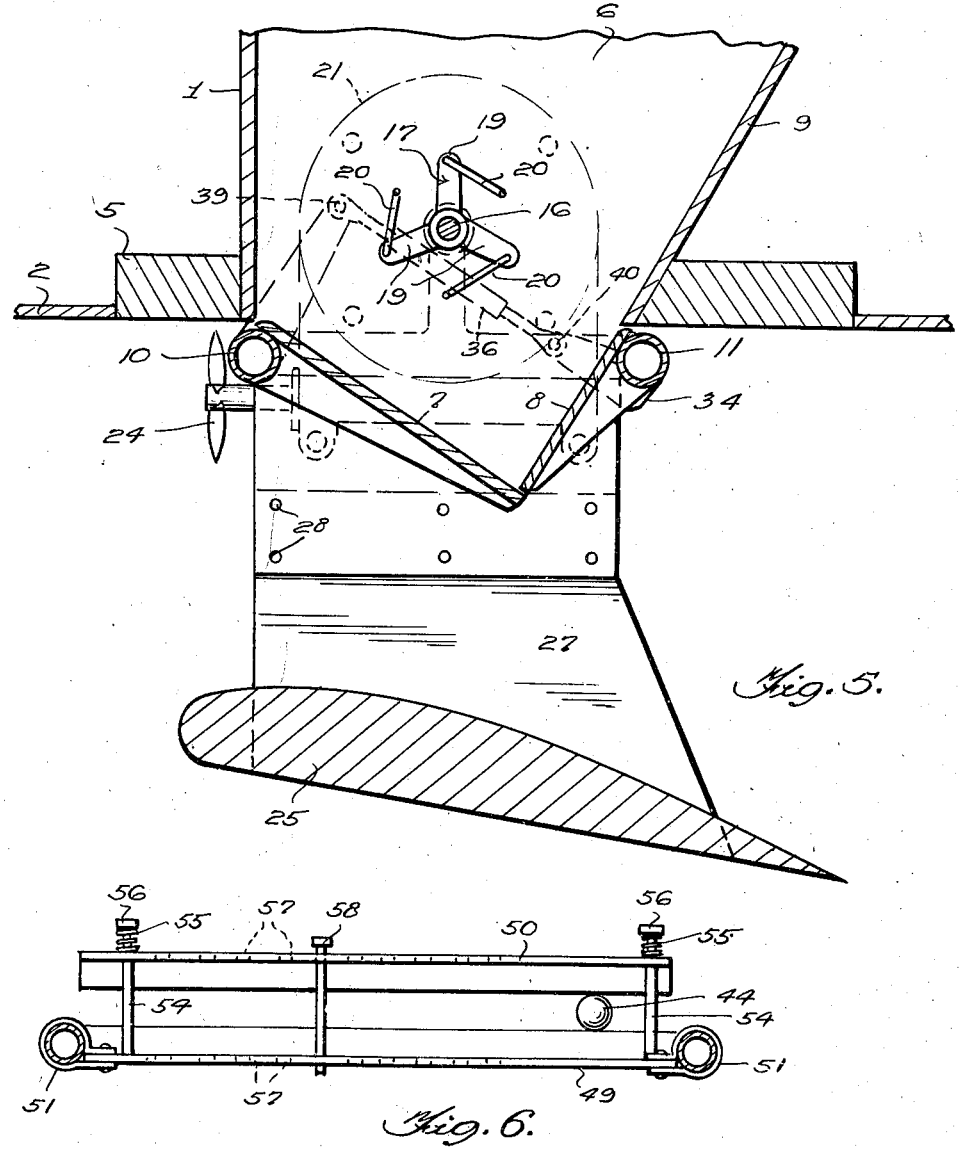

2,427,987

UNITED STATES PATENT OFFICE 2,427,987

APPARATUS FOR DISCHARGING INSECTICIDE FROM AIRPLANES

Arch C. Wilson, West Palm Beach, Fla.

Application May 8, 1945, Serial No. 592,608

1 Claim. (Cl. 244—136)

My invention relates to improvements in apparatus for discharging insecticides from airplanes to control insect life and fungus growth and the like.

The invention is designed with the primary object in view of providing a simple form of highly efficient apparatus to be easily embodied in an airplane, and whereby powdered insecticide may be broken up into dust form and discharged into the air by subjecting the same to the action of wind at high velocity.

Another object is to provide apparatus of the character and for the purpose above indicated, and which is adapted for presetting to selectively increase or decrease the quantity of insecticide discharged and to vary the action of the wind against the insecticide in accordance with the quantity discharged so that efficient operation is attained at all times regardless of quantity selection.

Other and subordinate objects also comprehended by my invention, together with the precise nature of my improvements and the manifold advantages thereof, will be readily understood when the succeeding description and claim are read with reference to the drawings accompanying and forming part of this specification.

In said drawings:

Figure 1 is a fragmentary view partly in side elevation and partly in section illustrating my improved apparatus embodied in an airplane, Figure 2 is a view in transverse section taken on the line 2—2 of Figure 1 and drawn to an enlarged scale, Figure 3 is a view in side elevation of the apparatus, partly broken away and showing the hopper gates closed in dotted lines and the gate-operating mechanism on one side of the hopper in gate-closing position, Figure 4 is a similar view showing the hopper gates open and the gate-operating mechanism in corresponding position, Figure 5 is a view in vertical section taken on the line 5—5 of Figure 2 and showing the hopper gates closed in full line with the gate-operating mechanism on the other side of the hopper in gate-closing position, Figure 6 is a view in horizontal section taken on the line 6—6 of Figure 1 and drawn to an enlarged scale.

Referring now to the drawings by numerals, according to my invention, in the preferred, illustrated embodiment thereof, a gravity feed supply hopper 1 for powdered or similarly finely divided insecticide, not shown, is suitably secured in the fuselage 2 of an airplane at a suitable distance forwardly of the cockpit 3, preferably with its top beneath a filler opening 4 in the fuselage 2. The hopper 1 may be secured in the fuselage 2 so as to be supported in part by a stiffener structure 5 located in the bottom of the fuselage 2 and through which the bottom of the hopper 1 depends, said structure 5 bracing the bottom of said hopper 1 against vibration forwardly and rearwardly particularly. The sides 6 of the hopper 1 depend below the bottom of the fuselage 2 a distance suitable for a purpose presently apparent.

A pair of front and rear gates 7, 8 form the bottom of the hopper 1, the front gate inclining downwardly and rearwardly at an angle of substantially 30°, when closed, and the rear gate 8 inclining, when closed, forwardly and downwardly at an angle of substantially 60° over the rear edge of the front gate 7 and lying in a common plane with an inclined back 9 of said hopper 1. The front gate 7 is suitably fixed at its front edge on a hollow, front rock shaft 10 to open downwardly and forwardly, and the rear gate 8 is similarly attached to a similar, rear rock shaft 11 to open downwardly and rearwardly. The front and rear rock shafts 10, 11 extend across the hopper 1 and are journaled at the ends thereof in a pair of cross bars 12, 13 extending along opposite sides 6 of said hopper 1 preferably just below the bottom of the fuselage 2, the ends of said shafts extending through said bars 12, 13. The bars 12, 13 may be attached to the sides 6 of the hopper in any suitable manner, as shown, and include a pair of central, upstanding bearing arms 14, 15 at opposite sides 6 of said hopper 1, respectively, for a purpose presently described.

Within the bottom part of the hopper 1 an agitator is provided comprising an agitator shaft 16 extending across said hopper 1 out of the sides 6 and being journaled at its opposite ends in the bearing arms 14, 15, respectively. A pair of spiders 17, 18 are fast on the agitator shaft 16 within the hopper 1 at opposite sides of said hopper. The spiders 17, 18 embody arms, as at 19, radial to the agitator shaft 16, and agitator rods 20 extend between the arms 19 of the pair of spiders 17, 18 diagonally of said shaft 16.

A reduction gear drive, represented conventionally at 21, of the worm gear type, is provided at one side 6 of the hopper 1 for driving the agitator shaft 16. The reduction gear drive 21 is supported by studs 22 extending laterally from said side 6 of the hopper 1 and includes a forwardly extending drive shaft 23 below the bottom of the fuselage 2, equipped with a propeller 24 for operation by air pressure when the airplane, as represented by the fuselage 2, is in flight.

An air foil 25 is mounted below the hopper gates 7, 8 and suspended from the sides 6 of the hopper 1 by a pair of side plates 26, 27 forming depending extensions of said sides 6, respectively, and bolts to said sides, as at 28. The air foil 25 has the form of an airplane wing, being similarly cambered on the top thereof, and is adjustable vertically to change the angle of incidence thereof in any suitable manner. As shown for this purpose, said air foil 25 is pivoted adjacent to its leading edge, as at 29, to said plates 26, 27 for vertical swinging adjustment. Bolt and slot connections 30, 31 adjacent the trailing edge of said air foil 25 provide for adjusting the same on the pivot 29 into different set positions.

Gate-operating mechanism is provided as follows: A pair of upstanding cranks 32, 33 are suitably fixed upon opposite ends of the front rock shaft 10, respectively, at substantially a right angle to the plane of the front gate 7. A pair of cranks 34, 35 are fixed upon opposite ends of the rear rock shaft 11 to extend forwardly at substantially a right angle to the plane of the rear gate 8. A pair of turn-buckles 36, 37 connect the pairs of cranks 32, 34 and 33, 35, respectively, and are pivoted to the outer ends of said cranks, as at 38, 39. The crank 35 is a bell crank with a depending lever arm 40' to the lower end of which is pivoted, as at 41, the front end of an operating rod 42 extending rearwardly and pivoted at its rear end, as at 43, to the lower end of an upright hand lever 44 in the cockpit 3. The hand lever 44 is pivoted adjacent its lower end, as at 45, on a suitable clamp 46 secured on a longéron 47 of the fuselage 2. The upper end of the hand lever 45 is arranged to play forwardly and rearwardly between a pair of horizontal, side-by-side clamping bars 49, 50, one of which, 49, is suitably fixed at its ends by clips 51 to an upright 52 and a diagonal 53 of the fuselage 2. The other clamping bar 50 is slidably mounted at its ends on the ends of said bar 49 by means of lateral headed studs 54 on said bar 49, whereby the bar 50 is movable into clamping relation with the bar 49 to frictionally grip the hand lever 44 therebetween. Springs 55 on said studs 54 between the heads 56 of the studs and the bar 50 yieldingly maintain the bar 50 against the hand lever 44 and the latter against the bar 49. Longitudinally spaced apertures 57 in the clamping bars 49, 50 opposed in pairs, and a pin 58 insertible in selected pairs of such apertures 57 provide a variable stop device for selectively limiting movement of the hand lever from gate-closing position, shown in Figure 1, forwardly into different set positions for variably opening the gates 7, 8 in a manner to be described.

Referring now to the operation of the described apparatus. With the airplane in flight and the hopper 1 filled with powdered or similar insecticide, not shown, the hand lever 44 is swung forwardly, counterclockwise as viewed in Figure 1, against the pin 58 and between the clamping bars 49, 50 which yieldingly hold said lever in the position in which it is thus set. Such swinging of the hand lever exerts a pull on the rod 42 and the lever arm 40' to swing the cranks 34, 35 counterclockwise and rock the rear rock shaft 11 in the same direction. Such rocking of the cranks 34, 35 and the rock shaft 11 swings the rear gate 8 downwardly and rearwardly into open position, the cranks 32, 33, through the turnbuckles 36, 37, swinging the cranks 33 clockwise to rock the rock shaft 10 clockwise and swing the front gate 7 downwardly and forwardly into open position. With the gates 7, 8 thus opened, the insecticide drops from the hopper 1 into the space between the air foil 25 and the opening between the gates 7, 8 and is blown rearwardly by air passing between the plates 27 and between the lower edge of the gate 7 and said air foil. The gravity discharge of the insecticide from the hopper 1 is facilitated and the insecticide prevented from clogging in the hopper 1 by operation of the agitator rods 20 and the spiders 17, 18 which are revolved by the propeller 24 and the described reduction gear drive 21 in a manner which will be clear. At this point it may be explained that in any open position of the front gate 7, said gate inclines downwardly and rearwardly. Thus, said front gate 7 forms together with the air foil 25 a funnel-like, or "venturi" like, air gap tapering rearwardly between the plates 26, 27 and the depending sides 6 of the hopper 1 between which air must pass and by means of which the velocity of the air passing therethrough is increased over the normal velocity occasioned by flight of the airplane. Also, as will be clear, the air gap thus formed may be variably restricted as the front gate 7 is opened wider to permit discharge of greater quantities of insecticide so that the velocity of the air passing through said gap may be increased as the quantity of discharge is increased. By setting the pin 58 in selected pairs of apertures 57 to establish a setting of the hand lever 44 in the manner already described, the quantity discharged from the hopper 1 may be pre-selected and the setting of the front gate 7 pre-selected for a corresponding velocity of air passing through said gap. The air foil 25, being of the form described, produces a slight vacuum in the bottom of said gap tending to facilitate a smooth flow of the insecticide from the hopper 1. This action may be varied by adjusting the air foil 25 in the manner already described. Also, said air foil 25 tends to neutralize the effects of the blast from the propeller of the airplane and which tends to rotate around the fuselage. The rear gate 8 acts as a back stop preventing the insecticide blow out of the apparatus from driving directly against the fuselage 2 and also from escaping from the described air gap before the air or wind has acted upon the insecticide. The air or wind acting under high velocity against the insecticide in said air gap tends to break up the same into dust form before the insecticide is discharged rearwardly.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In combination with the fuselage of an airplane, a gravity feed hopper for finely divided insecticide mounted in said fuselage with the bottom thereof depending below the same, means at the bottom of said hopper forming a wind passageway below the same of elongated form transversely of the fuselage opening forwardly and rearwardly of the fuselage with closed sides and a bottom and into which insecticide from the hopper is adapted to discharge to be blown rearwardly by wind passing through said passageway, and means operative to variably control quantity discharge from said hopper and to simultaneously restrict said passageway into rearwardly tapering form and thereby vary the velocity of the wind passing through the pasageway, said bottom of the passageway comprising an air foil having the form of an airplane wing for creating a vacuum on top thereof to cause when the fuselage is in flight a vacuum in the bottom of the passageway facilitating discharge from the hopper.

ARCH C. WILSON.

REFERENCES CITED

The following references are of record in the file of this patent:

UNITED STATES PATENTS

| Number | Name | Date |
|---|---|---|
| 1,396,319 | Champlin | Nov. 8, 1921 |
| 1,722,467 | Huff | July 30, 1929 |
| 1,761,889 | Junkers | June 3, 1930 |